United States Patent
Shang et al.

(10) Patent No.: US 11,023,147 B2
(45) Date of Patent: Jun. 1, 2021

(54) MAPPING STORAGE EXTENTS INTO RESILIENCY GROUPS

(71) Applicant: EMC IP Holding Company LLC, Hopkinton, MA (US)

(72) Inventors: Rongrong Shang, Beijing (CN); Geng Han, Beijing (CN); Jian Gao, Beijing (CN); Xinlei Xu, Beijing (CN); Xiaobo Zhang, Beijing (CN); Shuyu Lee, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/598,585

(22) Filed: Oct. 10, 2019

(65) Prior Publication Data
US 2021/0109664 A1 Apr. 15, 2021

(51) Int. Cl.
*G06F 3/06* (2006.01)

(52) U.S. Cl.
CPC .......... *G06F 3/0631* (2013.01); *G06F 3/0619* (2013.01); *G06F 3/0647* (2013.01); *G06F 3/0653* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 7,685,463 B1 | 3/2010 | Linnell | |
| 7,757,038 B2 * | 7/2010 | Kitahara | G11C 29/76 711/103 |
| 9,632,704 B2 * | 4/2017 | Gensler, Jr. | G06F 3/0683 |
| 10,126,988 B1 | 11/2018 | Han et al. | |
| 10,140,041 B1 | 11/2018 | Dong et al. | |
| 10,296,252 B1 | 5/2019 | Han et al. | |
| 10,318,169 B2 | 6/2019 | Dalmatov et al. | |
| 10,324,782 B1 | 6/2019 | Dorfman et al. | |
| 10,409,687 B1 | 9/2019 | Bono et al. | |
| 10,419,931 B1 | 9/2019 | Sohail et al. | |
| 10,496,278 B1 | 12/2019 | O'Hare et al. | |
| 10,592,111 B1 | 3/2020 | Wang et al. | |
| 10,678,643 B1 | 6/2020 | Gao et al. | |
| 2007/0118689 A1 * | 5/2007 | Hyde, II | G06F 3/0607 711/114 |

(Continued)

*Primary Examiner* — Elias Mamo
(74) *Attorney, Agent, or Firm* — BainwoodHuang

(57) ABSTRACT

Techniques for mapping large storage extents ("ubers") into storage drive groups ("resiliency groups") in a data storage system. The techniques can include, as the capacity of storage drives included in a first resiliency group is used up, forming a second resiliency group with one or more new storage drives. The disclosed techniques can further include allocating one or more storage drives from the first resiliency group to the second resiliency group to satisfy a requirement of a predetermined RAID storage configuration, and performing a reduced number of data movement operations to assure that data slices of one or more ubers initially assigned to the first resiliency group are allocated to storage drives in the same first or second resiliency group. In this way, data storage systems can be made to support a desired storage drive expansion with a reduced number of new storage drives.

16 Claims, 11 Drawing Sheets

(56) References Cited

U.S. PATENT DOCUMENTS

| | | | |
|---|---|---|---|
| 2009/0300315 A1* | 12/2009 | Agombar | G06F 3/0665 |
| | | | 711/170 |
| 2014/0089581 A1* | 3/2014 | DeNeui | G06F 3/0689 |
| | | | 711/114 |
| 2015/0081969 A1* | 3/2015 | Tanaka | G06F 3/0635 |
| | | | 711/114 |
| 2015/0286531 A1* | 10/2015 | Bondurant | G06F 11/1088 |
| | | | 714/6.23 |
| 2019/0042407 A1* | 2/2019 | Gao | G06F 12/0253 |

* cited by examiner

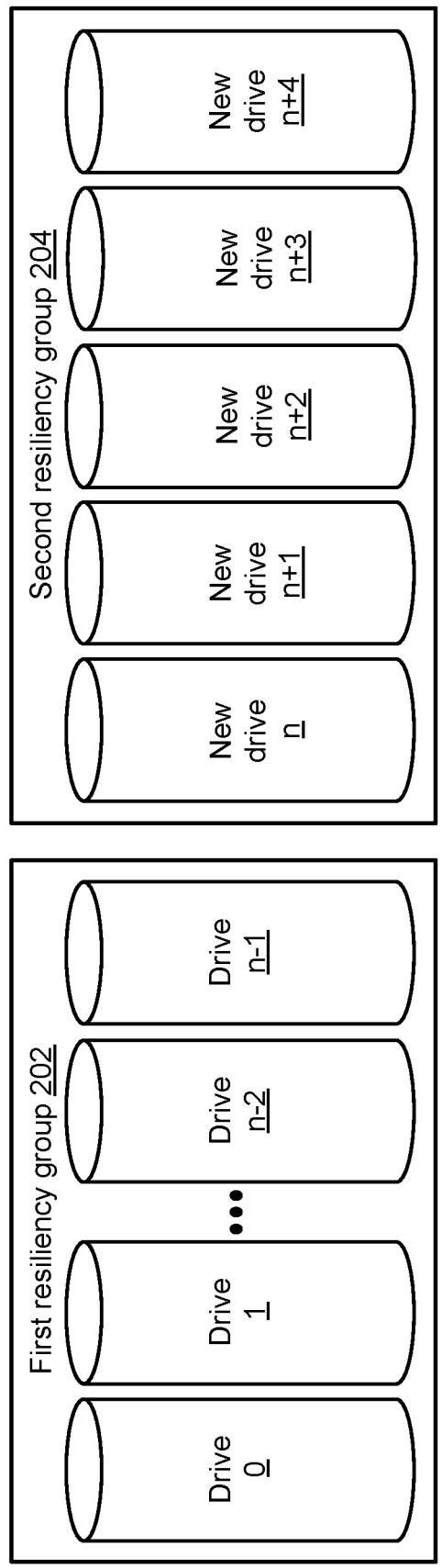
*Fig. 2a – Prior art*

Second resiliency group 404

| Drive 7 | Drive 8 | Drive 9 | Drive 10 | Drive 11 | Drive 12 | Drive 13 |
|---|---|---|---|---|---|---|
| S(7,0) | S(8,0) | S(9,0) | S(10,0) | S(11,0) | S(12,0) | S(13,0) |
| S(7,1) | S(8,1) | S(9,1) | S(10,1) | S(11,1) | S(12,1) | S(13,1) |
| S(7,2) | S(8,2) | S(9,2) | S(10,2) | S(11,2) | S(12,2) | S(13,2) |
| S(7,3) | S(8,3) | S(9,3) | S(10,3) | S(11,3) | S(12,3) | S(13,3) |
| S(7,4) | S(8,4) | S(9,4) | S(10,4) | S(11,4) | S(12,4) | S(13,4) |
| ... | ... | ... | ... | ... | ... | ... |
| S(7,k-2) | S(8,k-2) | S(9,k-2) | S(10,k-2) | S(11,k-2) | S(12,k-2) | S(13,k-2) |
| S(7,k-1) | S(8,k-1) | S(9,k-1) | S(10,k-1) | S(11,k-1) | S(12,k-1) | S(13,k-1) |

Uber 2: | S(8,4) | S(9,4) | S(10,4) | S(11,4) | S(12,4) |

MAPPING STORAGE EXTENTS INTO RESILIENCY GROUPS

BACKGROUND

RAID (Redundant Array of Inexpensive/Independent Disks) is a data storage technology designed to increase the resiliency and reliability of storage drive arrays, each of which can include one or more groups of physical storage drives. To achieve such increased resiliency and reliability, the maximum number of physical storage drives in each group is limited, so as to limit the total number of physical storage drives involved in a rebuild of storage data following a storage drive failure. Each such physical storage drive group can include one or more sub-groups of physical storage drives arranged in a specific RAID storage configuration, such as a "4+1" RAID-5 storage configuration that involves a sub-group of five (5) physical storage drives.

SUMMARY

In a typical RAID storage configuration, each physical storage drive in a storage drive array can be divided into a plurality of storage regions, which can accommodate data slices from one or more large storage extents. For example, in a "4+1" RAID-5 storage configuration, the size of each storage extent can be sixteen (16) gigabytes (GB) or any other suitable size, and the size of each data slice in each storage extent can be four (4) GB or any other suitable size. Accordingly, for each such storage extent in the "4+1" RAID-5 storage configuration, four (4) data slices and a single corresponding parity slice can be allocated to a sub-group of five (5) different storage drives of a physical storage drive group, which can include a limited maximum number of physical storage drives.

Unfortunately, there are drawbacks to the typical RAID storage configuration that employs a plurality of different storage drives among a limited maximum number of storage drives of a physical storage drive group. For example, as the capacity of the storage drives in the physical storage drive group is used up, it may become necessary to expand storage capacity by creating a second group of physical storage drives, and adding one or more new storage drives to the second physical storage drive group. For example, in a "4+1" RAID-5 storage configuration, at least five (5) new storage drives can be added to a second physical storage drive group to assure that four (4) data slices and a single corresponding parity slice can be allocated to a sub-group of five (5) different storage drives in the second physical storage drive group. However, such a situation can increase complexities and costs for data storage customers, who may actually require the capacity of less than five (5) new storage drives to satisfy their current data storage needs.

Techniques are disclosed herein for mapping large storage extents (also referred to herein as "ubers") into storage drive groups (also referred to herein as "resiliency groups") in a data storage system. The disclosed techniques can be employed in a RAID storage environment, in which a plurality of storage drives allocated to a first resiliency group are arranged in a predetermined RAID storage configuration. The disclosed techniques can include, as the capacity of the storage drives in the first resiliency group is used up, forming an additional second resiliency group that includes one or more new storage drives. The disclosed techniques can further include determining that the number of new storage drives in the second resiliency group does not conform to a requirement of the predetermined RAID storage configuration, and reallocating one or more storage drives from the first resiliency group to the second resiliency group to satisfy the requirement of the predetermined RAID storage configuration. Having reallocated the storage drive(s) from the first resiliency group to the second resiliency group, the disclosed techniques can further include determining that data slices of one or more ubers are allocated to storage drives in both the first resiliency group and the second resiliency group, and performing, as required and/or desired, a minimal or reduced number of data movement operations to reallocate the data slices of the respective ubers to the same first or second resiliency group.

By forming an additional second resiliency group with one or more new storage drives as the capacity of storage drives allocated to a first resiliency group is used up, reallocating one or more storage drives from the first resiliency group to the second resiliency group to satisfy a requirement of a predetermined RAID storage configuration, and performing, as required and/or desired, a minimal or reduced number of data movement operations to assure that data slices of each of one or more ubers distributed among storage drives in the first resiliency group and the second resiliency group are moved and reallocated to the same first or second resiliency group, data storage systems can be made to support a desired level of storage drive expansion with reduced complexities and costs for data storage customers.

In certain embodiments, a method of mapping ubers into resiliency groups in a data storage system includes, as a capacity of storage drives allocated to a first resiliency group is used up, forming an additional second resiliency group with one or more new storage drives, and reallocating one or more of the storage drives from the first resiliency group to the second resiliency group to satisfy a requirement of a predetermined RAID storage configuration. The reallocating of the storage drives causes data slices of one or more ubers to be distributed among storage drives in the first resiliency group and the second resiliency group. The method further includes performing a minimal number of data movement operations to move the data slices of each of the one or more ubers distributed among the storage drives in the first resiliency group and the second resiliency group to the same first or second resiliency group.

In certain arrangements, the method includes, having performed the minimal number of data movement operations to move the data slices of the respective ubers to the same first or second resiliency group, forming one or more sub-groups of storage drives in each of the first resiliency group and the second resiliency group, in which each sub-group of storage drives is arranged in the predetermined RAID storage configuration.

In certain arrangements, the method includes, having reallocated the storage drives from the first resiliency group to the second resiliency group, determining, for each respective uber among the one or more ubers distributed in the first and second resiliency group, (i) a first number of data slices of the respective uber that are allocated to storage drives in the first resiliency group, and (ii) a second number of data slices of the respective uber that are allocated to storage drives in the second resiliency group.

In certain arrangements, the method includes, for each respective uber among the one or more ubers distributed in the first and second resiliency group, determining a maximum number among the first number and the second number of data slices of the respective uber.

In certain arrangements, the method includes, having determined the maximum number of the data slices of the respective uber, obtaining an available storage capacity of a respective resiliency group among the first resiliency group and the second resiliency group that corresponds to the maximum number of the data slices of the respective uber.

In certain arrangements, the method includes determining that the available storage capacity of the respective resiliency group is sufficient to store all of the data slices of the respective uber, and assigning the respective uber to the respective resiliency group.

In certain arrangements, the method includes moving a minimum number of the data slices of the respective uber to the respective resiliency group to store all of the data slices of the respective uber in the respective resiliency group.

In certain arrangements, the method includes storing each of the data slices of the respective uber in a spare data slice of a respective storage drive in the respective resiliency group.

In certain arrangements, the method includes determining that no spare data slices are available in the respective resiliency group, and storing each of the data slices of the respective uber in a reserved data slice of a respective storage drive in the respective resiliency group.

In certain embodiments, a data storage system includes a storage drive array with a plurality of storage drives allocated to a first resiliency group, a memory, and processing circuitry configured to execute program instructions out of the memory to form, as a capacity of storage drives allocated to a first resiliency group is used up, an additional second resiliency group with one or more new storage drives, and to reallocate one or more of the storage drives from the first resiliency group to the second resiliency group to satisfy a requirement of a predetermined redundant array of independent disks (RAID) storage configuration, thereby causing data slices of one or more ubers to be distributed among storage drives in the first resiliency group and the second resiliency group. The processing circuitry is further configured to execute the program instructions out of the memory to perform a minimal number of data movement operations to move the data slices of each of the one or more ubers distributed among the storage drives in the first resiliency group and the second resiliency group to the same first or second resiliency group.

In certain arrangements, the processing circuitry is further configured to execute the program instructions out of the memory to maintain, for each respective uber, indications of (i) an assignment of the respective uber to the respective resiliency group, and (ii) allocations of the data slices of the respective uber within the respective resiliency group, as data structure metadata in one or more of the memory and the storage drive array of the data storage system.

In certain embodiments, a computer program product includes a set of non-transitory, computer-readable media having instructions that, when executed by processing circuitry of a data storage system, cause the processing circuitry to perform a method of mapping ubers into resiliency groups in the data storage system, in which the method includes, as a capacity of storage drives allocated to a first resiliency group is used up, forming an additional second resiliency group with one or more new storage drives, and reallocating one or more of the storage drives from the first resiliency group to the second resiliency group to satisfy a requirement of a predetermined RAID storage configuration. The reallocating of the storage drives causes data slices of one or more ubers to be distributed among storage drives in the first resiliency group and the second resiliency group. The method further includes performing a minimal number of data movement operations to move the data slices of each of the one or more ubers distributed among the storage drives in the first resiliency group and the second resiliency group to the same first or second resiliency group.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 2a is a block diagram of a conventional technique for expanding storage capacity in a data storage system;

FIG. 3a is a diagram of an exemplary first resiliency group implemented in the data storage system of FIG. 1, in which a plurality of ubers are allocated to storage drives arranged in a predetermined RAID (Redundant Array of Inexpensive/Independent Disks) storage configuration;

FIG. 3b is a diagram of the first resiliency group of FIG. 3a, as well as an exemplary second resiliency group implemented in the data storage system of FIG. 1, in which a plurality of storage drives have been reallocated from the first resiliency group to the second resiliency group;

FIG. 3c is a diagram of the first and second resiliency groups of FIG. 3b, in which a minimal or reduced number of data movement operations have been performed to reallocate data slices of respective ubers to the same first or second resiliency group;

FIG. 4a is a diagram of another exemplary first resiliency group implemented in the data storage system of FIG. 1, in which a plurality of ubers are allocated to storage drives arranged in a predetermined RAID storage configuration;

FIG. 4b is a diagram of the first resiliency group of FIG. 4a, in which the first resiliency group has experienced a first storage drive failure;

FIG. 4d is a diagram of another exemplary second resiliency group implemented in the data storage system of FIG. 1, in which a minimal or reduced number of data movement operations have been performed to reallocate data slices of respective ubers from the first resiliency group of FIG. 4c to the second resiliency group of FIG. 4d.

DETAILED DESCRIPTION

Techniques are disclosed herein for mapping large storage extents (also referred to herein as "ubers") into storage drive groups (also referred to herein as "resiliency groups") in a data storage system. The disclosed techniques can include, as the capacity of storage drives included in a first resiliency group is used up, forming an additional second resiliency group with one or more new storage drives. The disclosed techniques can further include allocating one or more storage drives from the first resiliency group to the second resiliency group to satisfy a requirement of a predetermined RAID (Redundant Array of Inexpensive/Independent Disks) storage configuration, and performing a minimal or reduced number of data movement operations to assure that data slices of one or more ubers initially assigned to the first resiliency group are allocated to storage drives within the same first or second resiliency group. In this way, data storage systems can be made to support a desired level of storage drive expansion with reduced complexities and costs for data storage customers.

Figure 1:
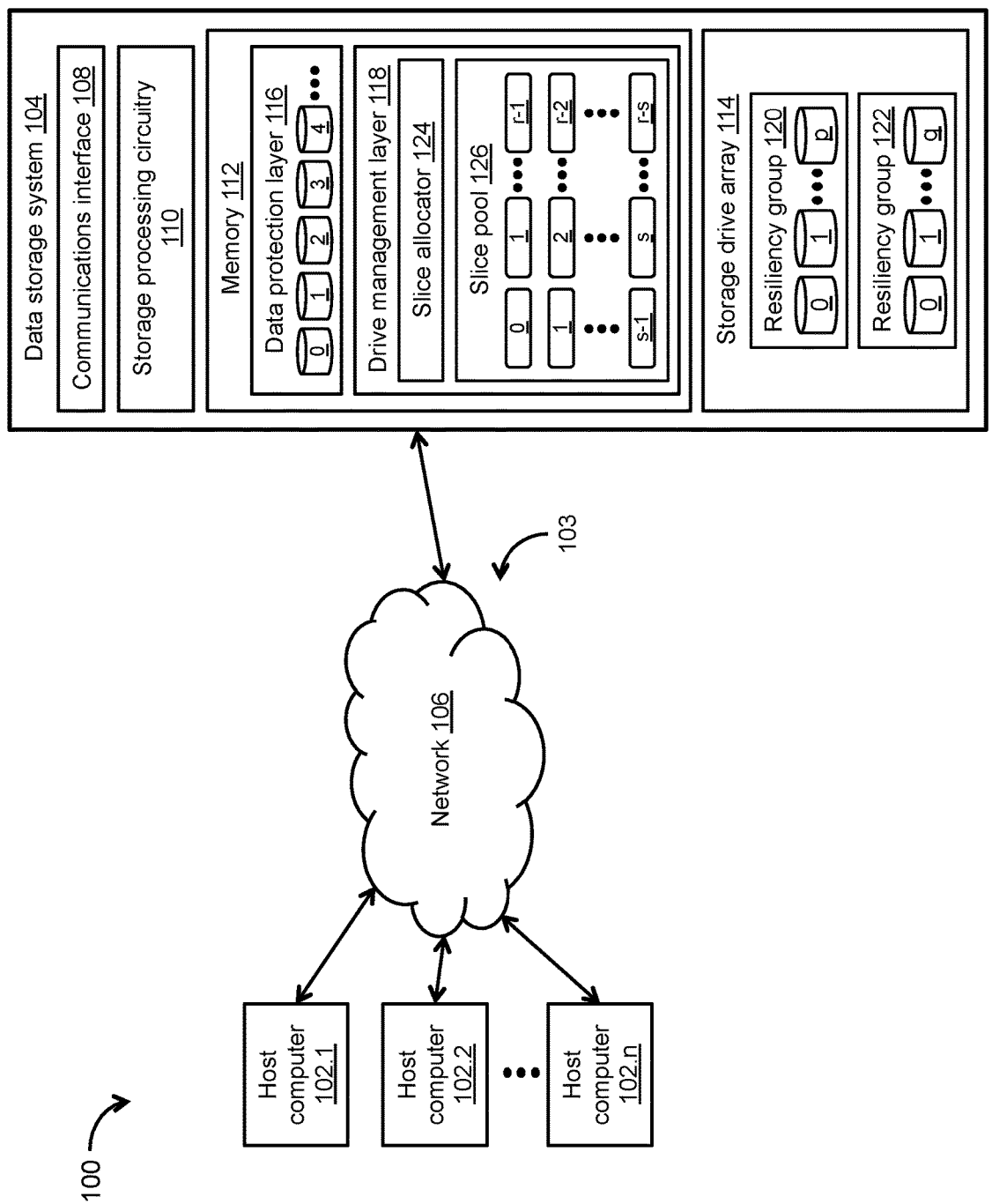
FIG. 1 is a block diagram of an exemplary data storage environment in which techniques can be practiced for mapping large storage extents (also referred to herein as "ubers") into storage drive groups (also referred to herein as "resiliency groups") in a data storage system.

FIG. 1 depicts an illustrative embodiment of an exemplary data storage environment 100 in which techniques can be practiced for mapping large storage extents ("ubers") into storage drive groups ("resiliency groups") in a data storage system. As shown in FIG. 1, the data storage environment 100 can include a plurality of host computers 102.1, 102.2, . . . , 102.n, a data storage system 104, and a communications medium 103 that includes at least one network 106. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 106, storage input/output (IO) requests (e.g., small computer system interface (SCSI) commands, network file system (NFS) commands) to the data storage system 104. For example, each such storage IO request (e.g., write request, read request) can direct the data storage system 104 to write or read data blocks, data pages, data files, and/or any other suitable data elements (also referred to herein as "host data") to/from virtual volumes (e.g., VMware® virtual volumes (VVOLs)), logical units (LUs), file systems, and/or any other suitable storage objects maintained in association with the data storage system 104.

The communications medium 103 can be configured to interconnect the plurality of host computers 102.1, . . . , 102.n and the data storage system 104 to enable them to communicate and exchange data and/or control signaling. As shown in FIG. 1, the communications medium 103 is illustrated as a "cloud" to represent different communications topologies such as a backbone topology, a hub-and-spoke topology, a loop topology, an irregular topology, and so on, or any suitable combination thereof. As such, the communications medium 103 can include copper based data communications devices and cabling, fiber optic based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

The data storage system 104 can include a communications interface 108, storage processing circuitry 110, a memory 112, and a storage drive array 114. The communications interface 108 can include SCSI target adapters, network interface adapters, and/or any other suitable adapters for converting electronic, optical, and/or wireless signals received over the network 106 to a form suitable for use by the storage processing circuitry 110. The memory 112 can include persistent memory (e.g., flash memory, magnetic memory) and/or non-persistent memory (e.g., dynamic random access memory (DRAM), static random access memory (SRAM)). Further, the memory 112 can accommodate a plurality of specialized software modules and/or logical constructs including, but not limited to, a data protection layer 116 and a drive management layer 118. The storage processing circuitry 110 can include one or more physical storage processors and/or engines configured to execute the specialized software modules and/or logical constructs, data movers, director boards, blades, IO modules, storage drive controllers, switches, and/or any other suitable computer hardware or combination thereof. For example, the storage processing circuitry 110 can execute such specialized software modules/logical constructs as program instructions out of the memory 112, process storage IO requests (e.g., write requests, read requests) issued by the respective host computers 102.1, . . . , 102.n, and/or store host data in any suitable data storage environment (e.g., a clustered or de-clustered RAID environment) implemented by the storage drive array 114.

In the context of the storage processing circuitry 110 being implemented using one or more processors executing specialized software modules/logical constructs, a computer program product can be configured to deliver all or a portion of the specialized software modules/logical constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques disclosed herein.

The storage drive array 114 can include one or more resiliency groups, such as a resiliency group 120 and a resiliency group 122. Each of the resiliency groups 120, 122 can include a plurality of physical storage drives such as solid state drives (SSDs), hard disk drives (HDDs), optical drives, and so on. For example, the resiliency group 120 can include a plurality of physical storage drives 0, 1, . . . , p. Likewise, the resiliency group 122 can include a plurality of physical storage drives 0, 1, . . . , q. To increase the resiliency and reliability of the storage drive array 114, the maximum number of physical storage drives included in each of the resiliency groups 120, 122 can be limited, so as to limit the total number of physical storage drives involved in a rebuild of storage data following a storage drive failure. For example, the number of physical storage drives included in each respective resiliency group 120, 122 can be limited to a maximum twenty-five (25), or any other suitable number of physical storage drives.

The data protection layer 116 is a logical construct configured to provide data redundancy features within the data storage system 104. The data protection layer 116 can include a plurality of virtual storage drives (such as virtual storage drives 0, 1, . . . , 4, . . . ), which can be obtained as a result of virtualizing a plurality of physical storage drives in the storage drive array 114. Further, a data protection algorithm, such as a RAID-5 data protection algorithm or any other suitable data protection algorithm, can be applied to the virtual storage drives 0, . . . , 4, . . . to obtain redundant information pertaining to storage data maintained in association with the data storage system 104. The virtual storage drives 0, ..., 4, ... to which the RAID-5 data protection algorithm is applied can therefore form a RAID-5 data protection domain or any other suitable data protection domain. It is noted that each of the virtual storage drives 0, 1, ..., 4, ... can have an address space that is divided into a plurality of slices (not shown), in which each slice can correspond to a certain size or amount of data storage area.

The drive management layer 118 is a logical construct configured to manage the plurality of physical storage drives 0, ..., p included in the resiliency group 120, as well as the plurality of physical storage drives 0, ..., q included in the resiliency group 122. Like the virtual storage drives 0, 1, ..., 4, ... in the data protection layer 116, each of the physical storage drives 0, ..., p, 0, ..., q in the storage drive array 114 can have an address space that is divided into a plurality of slices, each slice corresponding to a certain size or amount of data storage area. As shown in FIG. 1, the plurality of slices derived from the physical storage drives 0, ..., p, 0, ..., q can be represented by a plurality of slices 0, 1, ..., s−1, a plurality of slices 1, 2, ..., s, and so on, up to a plurality of slices r−1, r−2, ..., r−s, the totality of which can form a slice pool 126 in the drive management layer 118. For example, the respective slices 0, 1, ..., s−1, 1, 2, ..., s, ..., r−1, r−2, ..., r−s in the slice pool 126 can have the same data storage capacity or different data storage capacities. Further, each of the plurality of slices (not shown) in the data protection layer 116 can have the same data storage capacities as the respective slices 0, 1, ..., s−1, 1, 2, ..., s, ..., r−1, r−2, ..., r−s in the slice pool 126. As further shown in FIG. 1, the drive management layer 118 can include a slice allocator 124, which is configured to allocate slices for the physical storage drives 0, ..., p, 0, ..., q by mapping the slices 0, 1, ..., s−1, 1, 2, ..., s, ..., r−1, r−2, ..., r−s in the slice pool 126 to corresponding slices of the physical storage drives 0, ..., p, 0, ..., q.

During operation, the data storage system 104 including the data protection layer 116, the data management layer 118, and the storage drive array 114, can perform the various techniques disclosed herein to map large storage extents ("ubers") into physical storage drive groups ("resiliency groups"), each of which can be arranged in a predetermined RAID storage configuration. Using the disclosed techniques, the data storage system 104 can be made to support a desired level of storage drive expansion with a reduced number of new physical storage drives.

FIG. 2a depicts a conventional technique for expanding storage capacity in a data storage system. As shown in FIG. 2a, such a data storage system can have a storage drive array that includes a first resiliency group 202 with a plurality of physical storage drives 0, 1, ..., n−2, n−1. Further, the plurality of physical storage drives 0, 1, ..., n−2, n−1 in the first resiliency group 202 can include one or more sub-groups of physical storage drives arranged in a specific RAID storage configuration, such as a "4+1" RAID-5 storage configuration or any other suitable RAID storage configuration. As the capacity of the plurality of physical storage drives 0, 1, ..., n−2, n−1 in the first resiliency group 202 is used up, an additional second resiliency group 204 can be formed in the storage drive array of the data storage system. Because the sub-groups of physical storage drives in the first resiliency group 202 are arranged in the "4+1" RAID-5 storage configuration, the second resiliency group 204 formed in the storage drive array can include at least one sub-group of five (5) new physical storage drives, namely, the five (5) new physical storage drives "n", "n+1", "n+2", "n−3", "n−4", which are also arranged in the "4+1" RAID-5 storage configuration. However, such a situation can increase both complexity and cost for a data storage customer, who may actually require the capacity of less than five (5) new storage drives to satisfy his or her current data storage needs.

Figure 2B:
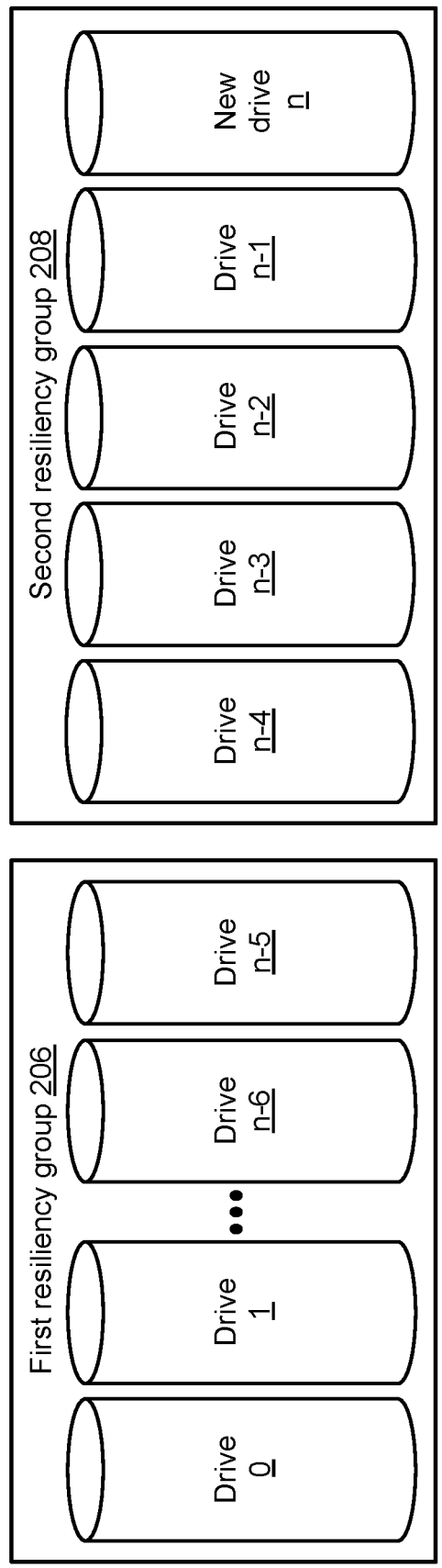
FIG. 2b is a block diagram of an exemplary technique for expanding storage capacity in the data storage system of FIG. 1.

FIG. 2b depicts an exemplary technique for expanding storage capacity in the data storage system 104 (see FIG. 1), which can be used to better address the data storage needs of the data storage customer. Like the data storage system described in relation to the conventional technique of FIG. 2a, the storage drive array 114 within the data storage system 104 can be configured to include a first resiliency group 206 with initially a plurality of physical storage drives 0, 1, ..., n−2, n−1. Further, the plurality of physical storage drives 0, 1, ..., n−2, n−1 in the first resiliency group 206 can include one or more sub-groups of physical storage drives arranged in the "4+1" RAID-5 storage configuration or any other suitable RAID storage configuration. As the capacity of the plurality of physical storage drives 0, 1, ..., n−2, n−1 in the first resiliency group 206 is used up, an additional second resiliency group 208 can be formed in the storage drive array 114.

However, rather than forming the second resiliency group 208 with at least one sub-group of five (5) new physical storage drives to satisfy a requirement of the "4+1" RAID-5 storage configuration, the second resiliency group 208 can be formed with less than five (5) new physical storage drives, such as a single new physical storage drive "n" (see FIG. 2b). Further, at least four (4) physical storage drives, such as the four (4) physical storage drives n−4, n−3, n−2, n−1 (see FIG. 2b), can be reallocated from the first resiliency group 206 to the second resiliency group 208 to form a sub-group of physical storage drives in the second resiliency group 208 that satisfies the requirement of the "4+1" RAID-5 storage configuration. In addition, once the four (4) physical storage drives n−4, n−3, n−2, n−1 have been reallocated from the first resiliency group 206 to the second resiliency group 208, if it is determined that data slices of one or more ubers are now allocated to physical storage drives in both the first resiliency group 206 and the second resiliency group 208, then a minimal or reduced number of data movement operations can be performed to reallocate the data slices of the respective ubers to the same first or second resiliency group 206, 208 (i.e., the same data protection domain).

By forming the second resiliency group 208 with just the number of new physical storage drives (e.g., the single new physical storage drive "n") required to satisfy the data storage needs of the data storage customer, reallocating one or more physical storage drives from the first resiliency group 206 to the second resiliency group 208 to satisfy the requirement of the "4+1" RAID-5 storage configuration, and performing, as required and/or desired, a minimal or reduced number of data movement operations to assure that data slices of one or more ubers are allocated to physical storage drives within the same first or second resiliency group 206, 208, the data storage system 104 can be made to support a desired level of storage drive expansion with reduced complexity and cost for a data storage customer.

Figure 3A:
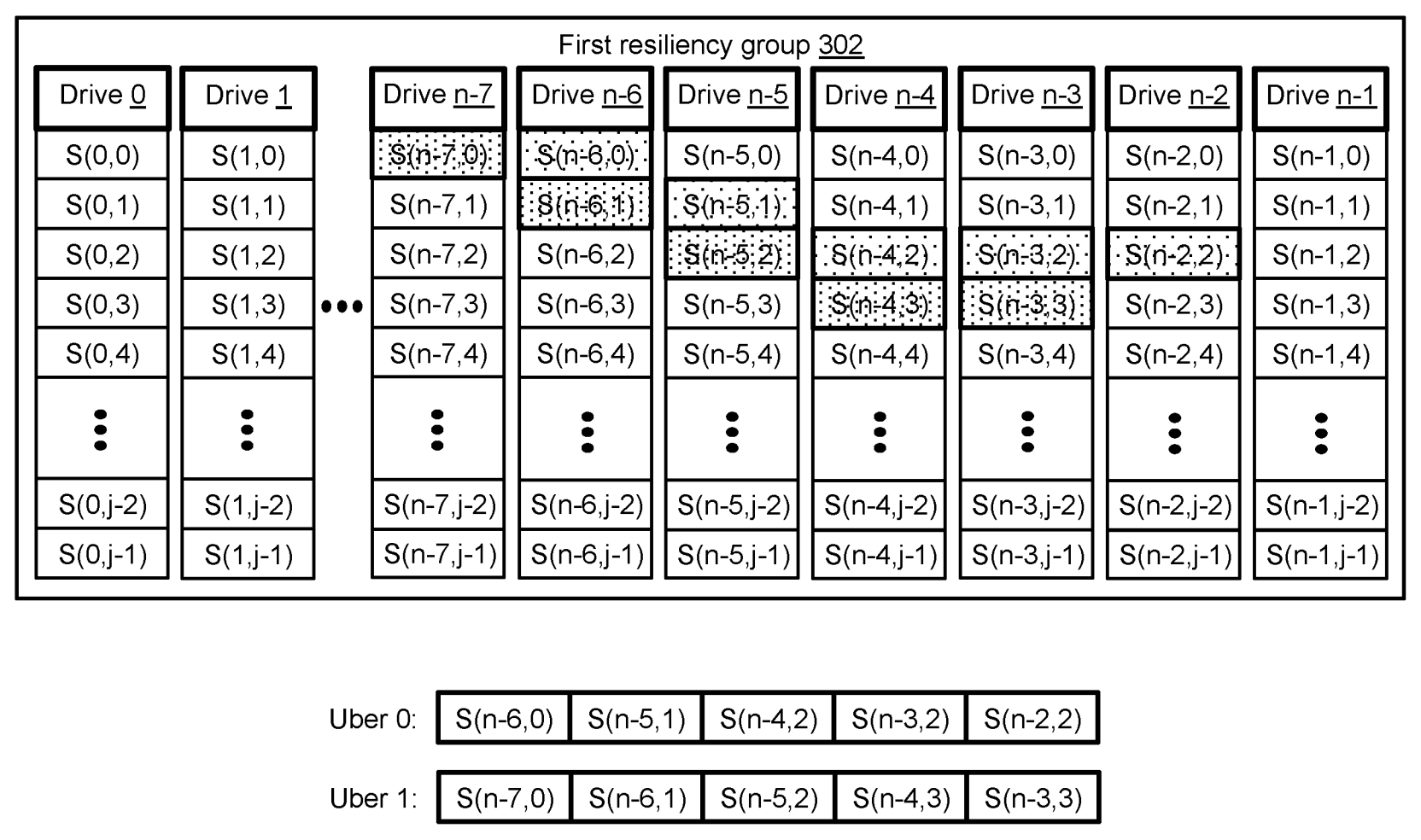
Figure 3B:
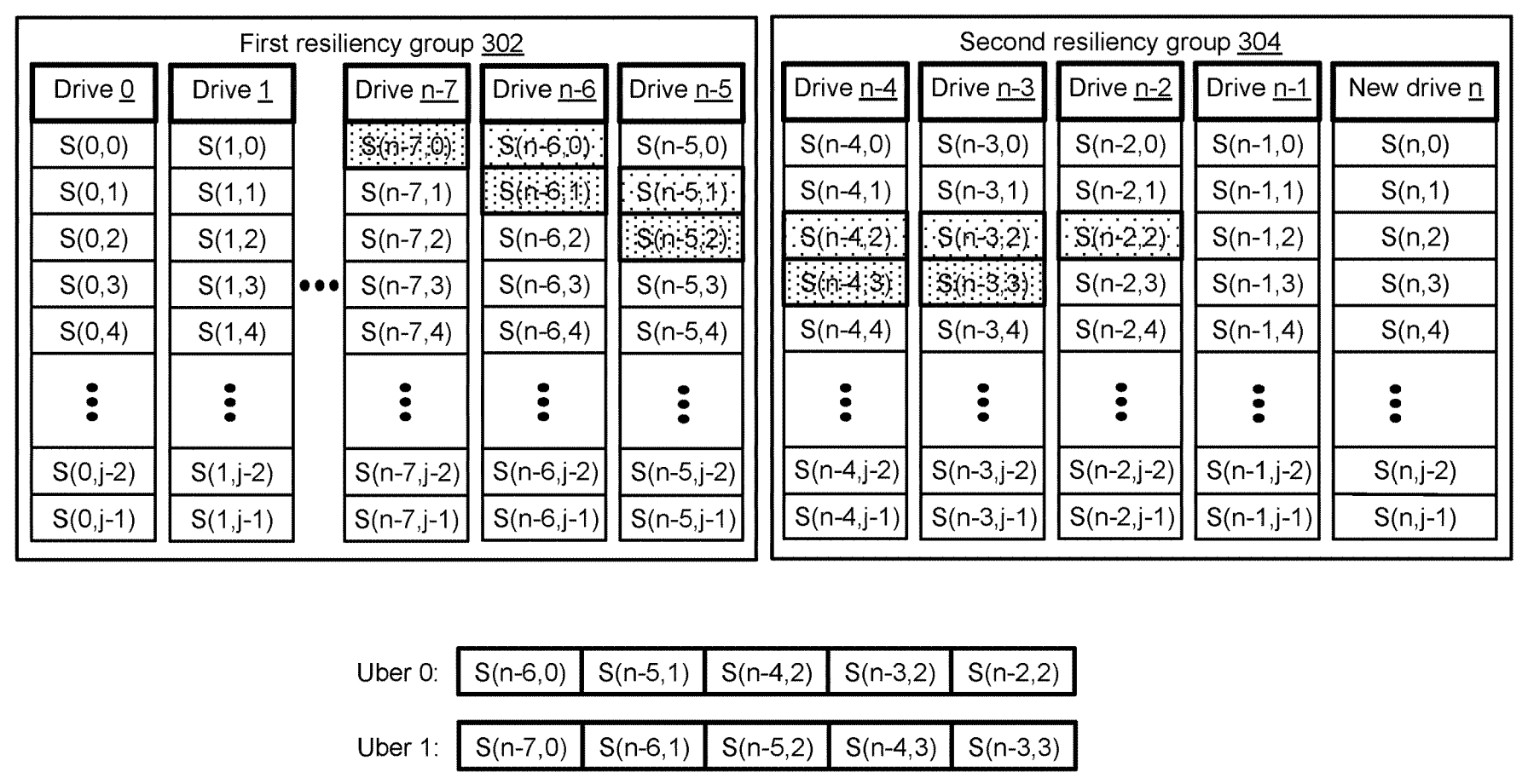
Figure 3C:
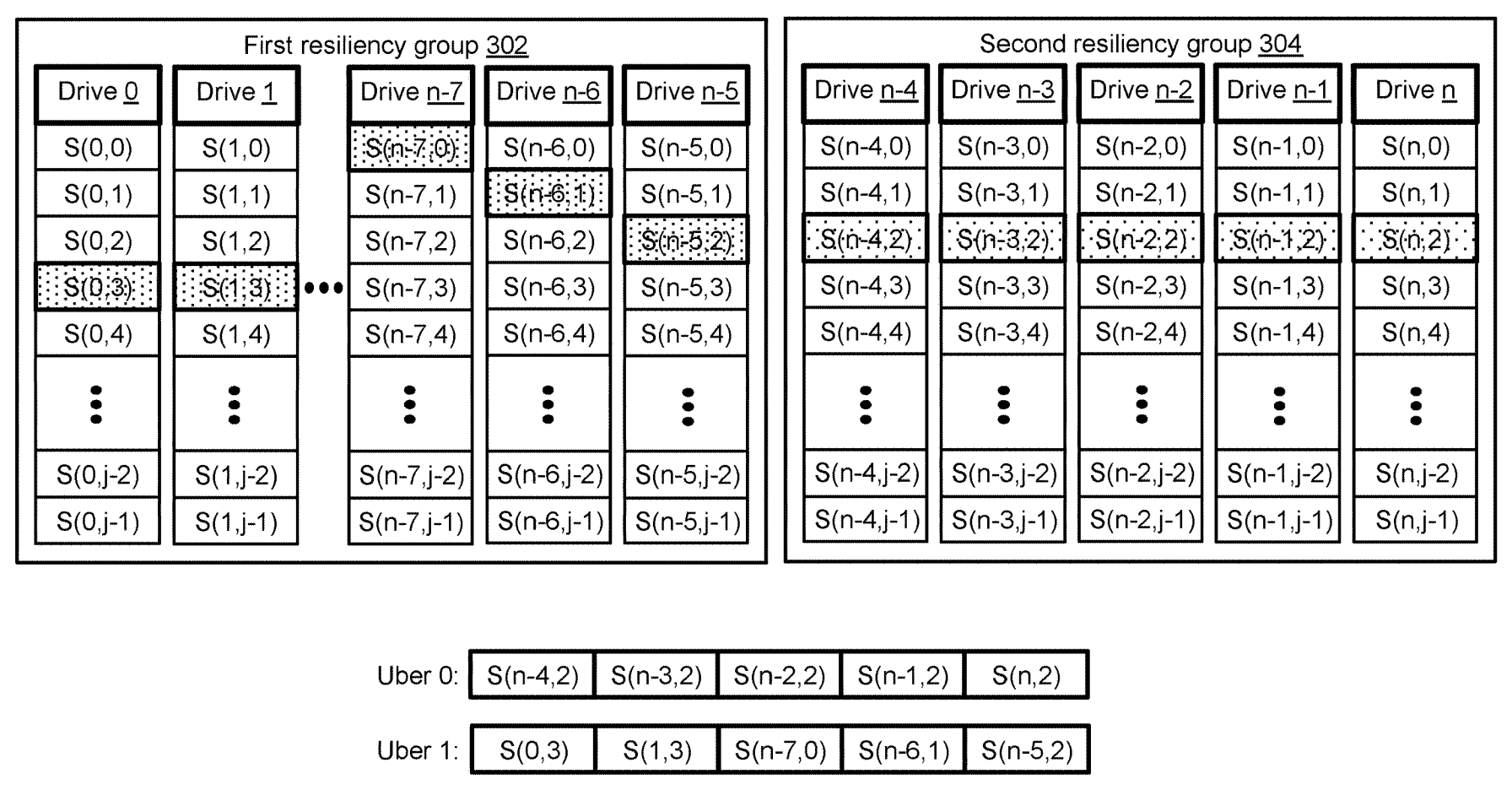

The disclosed techniques for mapping ubers into resiliency groups in a data storage system will be further understood with reference to the following first illustrative example, as well as FIGS. 3a-3c. In this first example, it is assumed that the storage drive array 114 of the data storage system 104 (see FIG. 1) includes a first resiliency group 302 (see FIG. 3a) with a plurality of physical storage drives, namely, a drive "0", a drive "1", and so on, up to a drive "n−1". As shown in FIG. 3a, each of the drives 0, 1, . . . , n−1 has an address space that is divided into "j" data slices S(m, 0), S(m, 1), . . . , S(m, j−1), in which "m" corresponds to a numerical integer value (0, 1, . . . , n−1) serving as an identifier of a respective physical storage drive. For example, the drive "0" can have an address space divided into "j" data slices S(0, 0), S(0, 1), . . . , S(0, j−1). Likewise, the drive "1" can have an address space divided into "j" data slices S(1, 0), S(1, 1), . . . , S(1, j−1), and so on, up to the drive "n−1", which can have an address space divided into "j" data slices S(n−1, 0), S(n−1, 1), . . . , S(n−1, j−1). In this first example, it is further assumed that the first resiliency group 302 includes a plurality of sub-groups of physical storage drives among the drives 0, 1, . . . , n−1 arranged in a "4+1" RAID-5 storage configuration, and that a plurality of ubers, such as an uber "0" and an uber "1", are assigned to the first resiliency group 302. As further shown in FIG. 3a, to satisfy a requirement of the "4+1" RAID-5 storage configuration, the uber "0" is divided into five (5) data slices, which can be allocated to data slices S(n−6, 0), S(n−5, 1), S(n−4, 2), S(n−3, 2), S(n−2, 2) of the drives "n−6", "n−5", "n−4", "n−3", "n−2", respectively. Likewise, the uber "1" is divided into five (5) data slices, which can be allocated to data slices S(n−7, 0), S(n−6, 1), S(n−5, 2), S(n−4, 3), S(n−3, 3) of the drives "n−7", "n−6", "n−5", "n−4", "n−3", respectively. It is noted that any other suitable allocations of the data slices of the respective ubers 0, 1 to the data slices of the respective drives 0, 1, . . . , n−1 can be performed to achieve a desired level of drive utilization within the first resiliency group 302.

As the capacity of the drives 0, 1, . . . , n−1 in the first resiliency group 302 is used up, an additional second resiliency group 304 (see FIG. 3b) is formed in the storage drive array 114 of the data storage system 104. In this first example, it is assumed that one new physical storage drive, namely, a new drive "n" (see FIG. 3b), is sufficient to satisfy the needs of the data storage customer. The second resiliency group 304 is therefore formed in the storage drive array 114 with the one new drive "n". Further, to satisfy the requirement of the "4+1" RAID-5 storage configuration, at least four (4) physical storage drives, such as the four (4) drives "n−4", "n−3", "n−2", "n−1", are reallocated from the first resiliency group 302 to the second resiliency group 304 to form a sub-group including the four (4) drives "n−4", "n−3", "n−2", "n−1" plus the new drive "n" in the second resiliency group 304.

However, in this first example, once the four (4) drives "n−4", "n−3", "n−2", "n−1" have been reallocated from the first resiliency group 302 to the second resiliency group 304, it is determined that data slices of each of the ubers 0, 1 are now allocated to data slices of physical storage drives in both the first resiliency group 302 and the second resiliency group 304. For example, two (2) data slices of the uber "0" are allocated to the data slices S(n−6, 0), S(n−5, 1) of the drives "n−6", "n−5", respectively, in the first resiliency group 302, and three (3) data slices of the uber "0" are allocated to the data slices S(n−4, 2), S(n−3, 2), S(n−2, 2) of the drives "n−4", "n−3", "n−2", respectively, in the second resiliency group 304. Further, three (3) data slices of the uber "1" are allocated to the data slices S(n−7, 0), S(n−6, 1), S(n−5, 2) of the drives "n−7", "n−6", "n−5", respectively, in the first resiliency group 302, and two (2) data slices of the uber "1" are allocated to the data slices S(n−4, 3), S(n−3, 3) of the drives "n−4", "n−3", respectively, in the second resiliency group 304.

To assure that the data slices of the respective ubers 0, 1 are allocated to physical storage drives within the same first or second resiliency group 302, 304 (i.e., the same data protection domain), a minimal or reduced number of data movement operations can be performed, as follows. First, a calculation or determination is made as to how many data slices of each uber 0, 1 are allocated to each of the first and second resiliency groups 302, 304. As described herein, three (3) data slices of the uber "0" are allocated to the second resiliency group 304, and two (2) data slices of the uber "0" are allocated to the first resiliency group 302. Further, three (3) data slices of the uber "1" are allocated to the first resiliency group 302, and two (2) data slices of the uber "1" are allocated to the second resiliency group 304. The majority or most of the data slices of the uber "0" (i.e., 3 data slices) are therefore allocated to the second resiliency group 304, and the majority or most of the data slices of the uber "1" (i.e., 3 data slices) are therefore allocated to the first resiliency group 302.

A further calculation or determination is then made as to whether or not the second resiliency group 304 has sufficient available storage capacity to accommodate the remaining lesser amount of data slices of the uber "0" (i.e., 2 data slices) currently allocated to the first resiliency group 302. If it is determined that the second resiliency group 304 has sufficient available storage capacity, then the uber "0" is assigned to the second resiliency group 304, an indication of such assignment of the uber "0" is stored in the memory 112, and a minimal or reduced number of data movement operations are performed to reallocate the two (2) data slices of the uber "0" from the first resiliency group 302 to the second resiliency group 304. Similarly, a further calculation or determination is made as to whether or not the first resiliency group 302 has sufficient available storage capacity to accommodate the remaining lesser amount of data slices of the uber "1" (i.e., 2 data slices) currently allocated to the second resiliency group 304. If it is determined that the first resiliency group 302 has sufficient available storage capacity, then the uber "1" is assigned to the first resiliency group 302, an indication of such assignment of the uber "1" is stored in the memory 112, and a minimal or reduced number of data movement operations are performed to reallocate the two (2) data slices of the uber "1" from the second resiliency group 304 to the first resiliency group 302. It is noted that the resiliency group assignments for the respective ubers 0, 1, as well as the data slice allocations for the ubers 0, 1 within the respective resiliency groups 302, 304, can be maintained as data structure metadata in the memory 112 and/or the storage drive array 114 of the data storage system 104 (see FIG. 1).

FIG. 3c depicts the first resiliency group 302 and the second resiliency group 304 following reallocation of the data slices of the respective ubers 0, 1 to the same first or second resiliency group 302, 304 (i.e., the same data protection domain). As shown in FIG. 3c, three (3) data slices of the uber "0" remain allocated to the data slices S(n−4, 2), S(n−3, 2), S(n−2, 2) of the drives "n−4", "n−3", "n−2", respectively, of the second resiliency group 304, while two (2) data slices of the uber "0" are reallocated to data slices S(n−1, 2), S(n, 2) of the drives "n−1", "n", respectively, of the same second resiliency group 304. Further, three (3) data slices of the uber "1" remain allocated to the data slices S(n−7, 0), S(n−6, 1), S(n−5, 2) of the drives "n−7", "n−6", "n−5", respectively, of the first resiliency group 302, while two (2) data slices of the uber "1" are reallocated to data slices S(0, 3), S(1, 3) of the drives "0", "1", respectively, of the same first resiliency group 302. It is noted that any other suitable allocations of the data slices of the uber "1" to the data slices of the respective drives 0, 1, . . . , n–5 of the first resiliency group 302, and any other suitable allocations of the data slices of the uber "0" to the data slices of the respective drives n–4, n–3, . . . , n of the second resiliency group 304, can be performed to achieve a desired level of drive utilization across the first and second resiliency groups 302, 304.

Figure 4A:
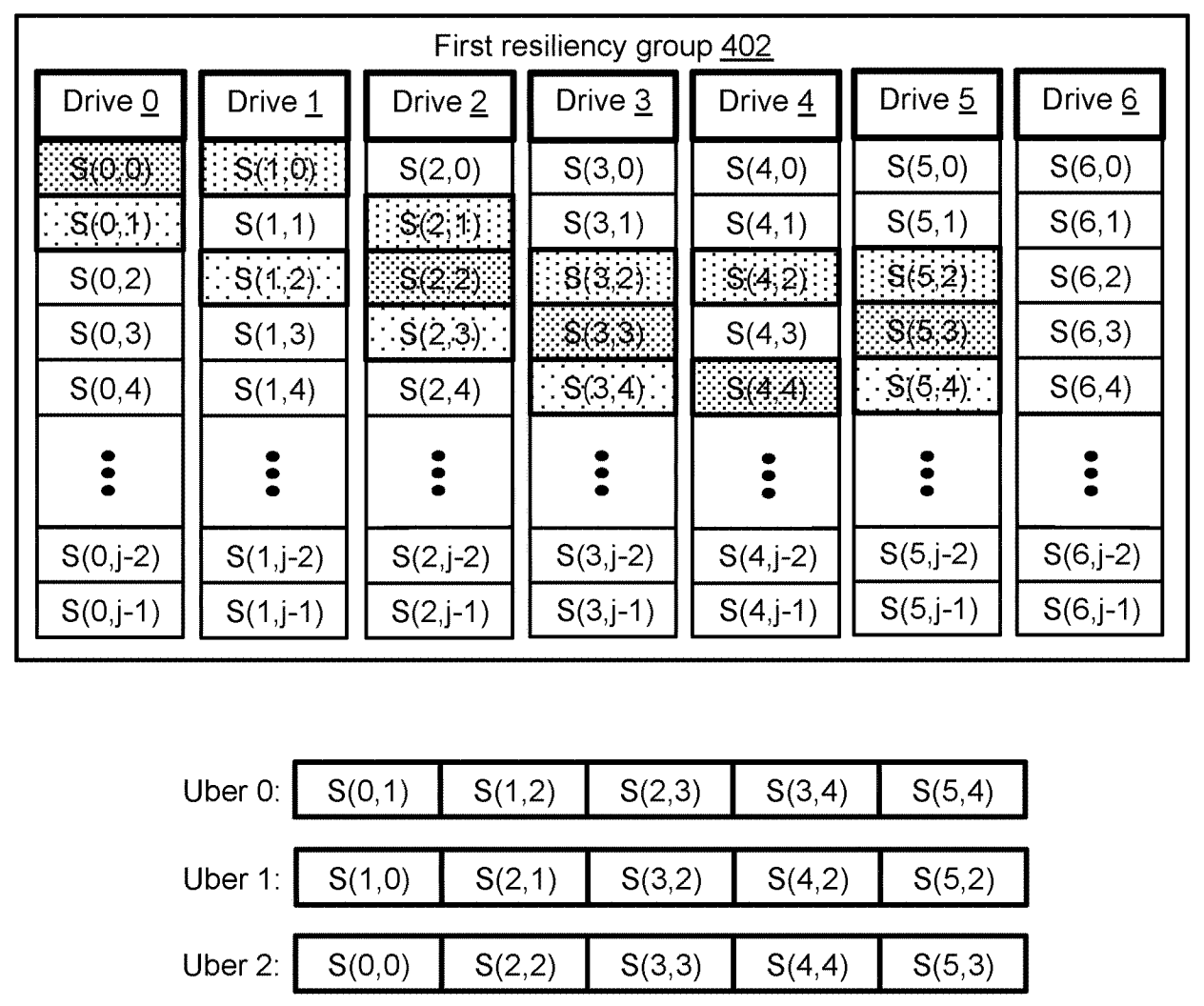
Figure 4B:
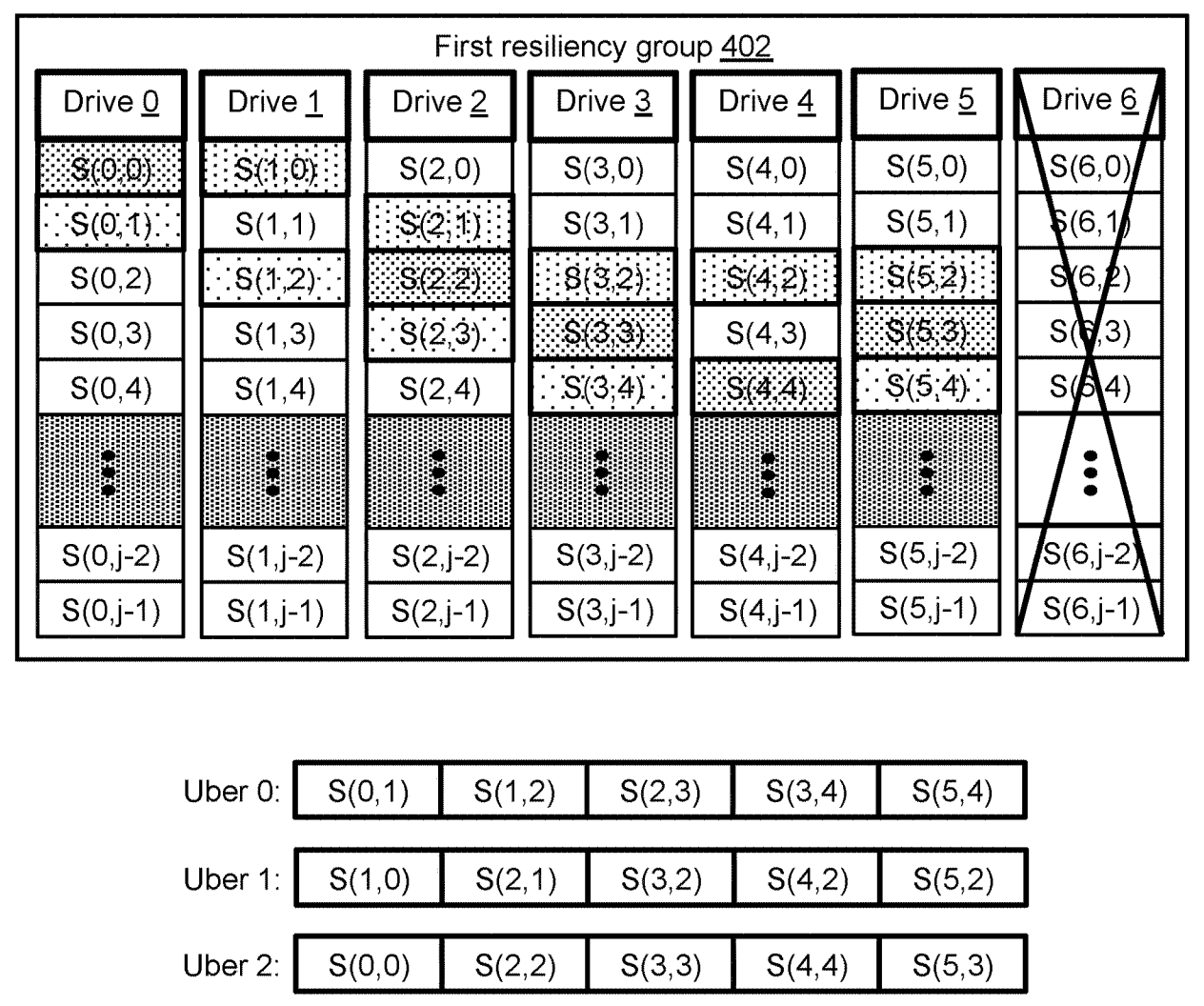
Figure 4C:
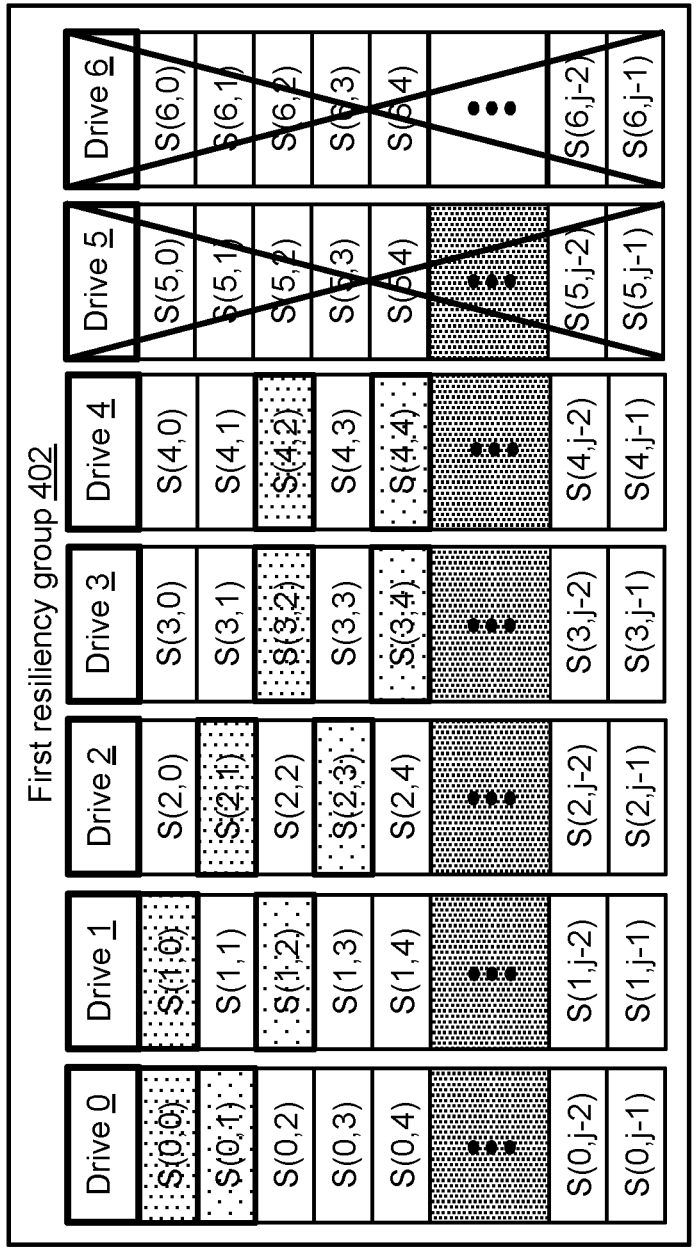
FIG. 4c is a diagram of the first resiliency group of FIG. 4a, in which the first resiliency group has experienced a second storage drive failure.

The disclosed techniques for mapping ubers into resiliency groups in a data storage system will also be further understood with reference to the following second illustrative example, as well as FIGS. 4a-4d. In this second example, it is assumed that the storage drive array 114 of the data storage system 104 (see FIG. 1) includes a first resiliency group 402 (see FIG. 4a) with a plurality of physical storage drives, namely, a drive "0", a drive "1", and so on, up to a drive "6", as well as a second resiliency group 404 (see FIG. 4d) with a plurality of physical storage drives, namely, a drive "7", a drive "8", and so on, up to a drive "13". As shown in FIG. 4a, each of the drives 0, 1, . . . , 6 in the first resiliency group 402 has an address space that is divided into "j" data slices. For example, the drive "0" can have an address space divided into "j" data slices S(0, 0), S(0, 1), . . . , S(0, j–1). Likewise, the drive "1" can have an address space divided into "j" data slices S(1, 0), S(1, 1), . . . , S(1, j–1), and so on, up to the drive "6", which can have an address space divided into "j" data slices S(6, 0), S(6, 1), . . . , S(6, j–1). Further, the data slices ranging between S(0, 4) and S(0, j–2) of the drive "0", the data slices ranging between S(1, 4) and S(1, j–2) of the drive "1", and so on, up to the data slices ranging between S(6, 4) and S(6, j–2) of the drive "6", are reserved to replace or accommodate data slices of a single physical storage drive that fails or otherwise becomes inoperative within the first resiliency group 402. For example, such ranges of data slices of up to any six (6) of the drives 0, 1, . . . , 6 can be reserved to accommodate, after a rebuild, the data slices of a single physical storage drive that becomes inoperative within the first resiliency group 402.

As shown in FIG. 4d, each of the drives 7, 8, . . . , 13 in the second resiliency group 404 has an address space that is divided into "k" data slices. For example, the drive "7" can have an address space divided into "k" data slices S(7, 0), S(7, 1), . . . , S(7, k–1). Likewise, the drive "8" can have an address space divided into "k" data slices S(8, 0), S(8, 1), . . . , S(8, k–1), and so on, up to the drive "13", which can have an address space divided into "k" data slices S(13, 0), S(13, 1), . . . , S(13, k–1). Further, the data slices ranging between S(7, 4) and S(7, k–2) of the drive "7", the data slices ranging between S(8, 4) and S(8, k–2) of the drive "8", and so on, up to the data slices ranging between S(13, 4) and S(13, k–2) of the drive "12", are reserved to replace or accommodate data slices of a single physical storage drive that fails or otherwise becomes inoperative within the second resiliency group 404. For example, such ranges of data slices of up to any six (6) of the drives 7, 8, . . . , 13 can be reserved to accommodate, after a rebuild, the data slices of a single physical storage drive that becomes inoperative within the second resiliency group 404.

It is further assumed that the first resiliency group 402 includes a plurality of sub-groups of physical storage drives among the drives 0, 1, . . . , 6 arranged in a "4+1" RAID-5 storage configuration, and that a plurality of ubers, such as an uber "0", an uber "1", and an uber "2", are assigned to the first resiliency group 402. As shown in FIG. 4a, to satisfy a requirement of the "4+1" RAID-5 storage configuration, the uber "0" is divided into five (5) data slices, which can be allocated to data slices S(0, 1), S(1, 2), S(2, 3), S(3, 4), S(5, 4) of a sub-group of drives "0", "1", "2", "3", "5", respectively. Likewise, the uber "1" is divided into five (5) data slices, which can be allocated to data slices S(1, 0), S(2, 1), S(3, 2), S(4, 2), S(5, 2) of a sub-group of drives "1", "2", "3", "4", "5", respectively; and, the uber "2" is divided into five (5) data slices, which can be allocated to data slices S(0, 0), S(2, 2), S(3, 3), S(4, 4), S(5, 3) of a sub-group of drives "O", "2", "3", "4", "5", respectively. It is noted that any other suitable allocations of the data slices of the respective ubers 0, 1, 2 to the data slices of the drives 0, 1, . . . , 6 can be performed.

In this second example, the first resiliency group 402 experiences a first failure of one of its physical storage drives, namely, the drive "6", as indicated by the cross "X" on the drive "6" (see FIG. 4b). Once the failure of the drive "6" is detected, a rebuild of storage data on the drive "6" is performed, and the data slices of the failed drive "6" are replaced by available data slices of some or all of the drives 0, 1, . . . , 5, while continuing to satisfy the requirement of the "4+1" RAID-5 storage configuration. For example, the data slices of the failed drive "6" can be replaced by spare data slices of some or all of the drives 0, 1, . . . , 5, and/or the reserved data slices between the data slices S(0, 4) and S(0, j–2) of the drive "0", the reserved data slices between the data slices S(1, 4) and S(1, j–2) of the drive "1", and so on, up to the reserved data slices between the data slices S(5, 4) and S(5, j–2) of the drive "5", and/or any other suitable available data slices of the respective drives 0, 1, . . . , 5.

Further, in this second example, the first resiliency group 402 experiences a second failure of one of its physical storage drives, namely, the drive "5", as indicated by the cross "X" on the drive "5" (see FIG. 4c). However, because the capacity of the spare and/or reserved data slices of the drives 0, 1, . . . , 5 in the first resiliency group 402 has been used up due to the failure of the drive "6", the data slices of the failed drive "5" cannot be replaced by any spare/reserved data slices of the drives 0, 1, . . . , 4. A calculation or determination is then made as to whether or not the second resiliency group 404 has sufficient available storage capacity to accommodate at least the data slices of the failed drive "5" after a rebuild. Having determined that the second resiliency group 404 has sufficient available storage capacity, one or more of the ubers 0, 1, 2 initially assigned to the first resiliency group 402 are reassigned to the second resiliency group 404, while continuing to satisfy the requirement of the "4+1" RAID-5 storage configuration. For example, the uber "2" initially assigned to the first resiliency group 402 can be reassigned to the second resiliency group 404, while the uber "0" and the uber "1" remain assigned to the first resiliency group 402. It is noted that any other suitable assignments/reassignments of the ubers 0, 1, 2 to the respective first and second resiliency groups 402, 404 can be performed.

Having reassigned the uber "2" to the second resiliency group 404, the five (5) data slices of the uber "2" are moved to data slices S(8, 4), S(9, 4), S(10, 4), S(11, 4), S(12, 4) of a sub-group of drives "8", "9", "10", "11", "12", respectively, in the second resiliency group 404 (see FIG. 4d). Further, once the uber "2" has been reassigned to the second resiliency group 404, the data slice of the uber "0" initially allocated to the data slice S(5, 4) of the failed drive "5" can be reallocated to the spare data slice S(4, 4) of the drive "4" in the first resiliency group 402 (see FIG. 4c). Following such reallocation to the spare data slice S(4, 4) of the drive "4", the five (5) data slices of the uber "0" now correspond to the data slices S(0, 1), S(1, 2), S(2, 3), S(3, 4), S(4, 4) of a sub-group of drives "0", "1", "2", "3", "4", respectively, in the first resiliency group 402 (see FIG. 4c). It is noted that the data slice S(4, 4) of the drive "4" in the first resiliency group 402 was freed and made available to the uber "0" due to the reassignment of the uber "2" to the second resiliency group 404.

In addition, once the uber "2" has been reassigned to the second resiliency group 404, the data slice of the uber "1" initially allocated to the data slice S(5, 2) of the failed drive "5" can be reallocated to the spare data slice S(0, 0) of the drive "0" in the first resiliency group 402 (see FIG. 4c). Following such reallocation to the spare data slice S(0, 0) of the drive "0", the five (5) data slices of the uber "1" now correspond to the data slices S(0, 0), S(1, 0), S(2, 1), S(3, 2), S(4, 2) of a sub-group of drives "0", "1", "2", "3", "4", respectively, in the first resiliency group 402 (see FIG. 4c). It is noted that the data slice S(0, 0) of the drive "0" in the first resiliency group 402 was freed and made available to the uber "1" due to the reassignment of the uber "2" to the second resiliency group 404.

It is further noted that any other suitable data movements, uber assignments or reassignments, and/or slice allocations or reallocations pertaining to the ubers 0, 1, 2 within or between the respective first and second resiliency groups 402, 404 can be performed. Such data movements, uber assignments/reassignments, and/or slice allocations/reallocations can also be performed in accordance with any desired order of priorities. For example, a first priority may be to minimize or reduce the number of data movement operations required to allocate or reallocate data slices of one or more of the ubers 0, 1, 2 to the same first or second resiliency group 402, 404. Further, if the capacity of the drives 0, 1, . . . , 6 in the first resiliency group 402 is used up, then a second priority may be to assign one or more of the ubers 0, 1, 2 to the second resiliency group 404, and to allocate the data slices of the respective ubers 0, 1, and/or 2 to available spare data slices of the drives 7, 8, . . . , and/or 13 in the second resiliency group 404. Still further, if no spare data slices are available in the second resiliency group 404, then a third priority may be to allocate the data slices of the respective ubers 0, 1, and/or 2 to reserved data slices of the drives 7, 8, . . . , and/or 13 in the second resiliency group 404. It is understood that any other suitable order of priorities may be employed.

Figure 5:
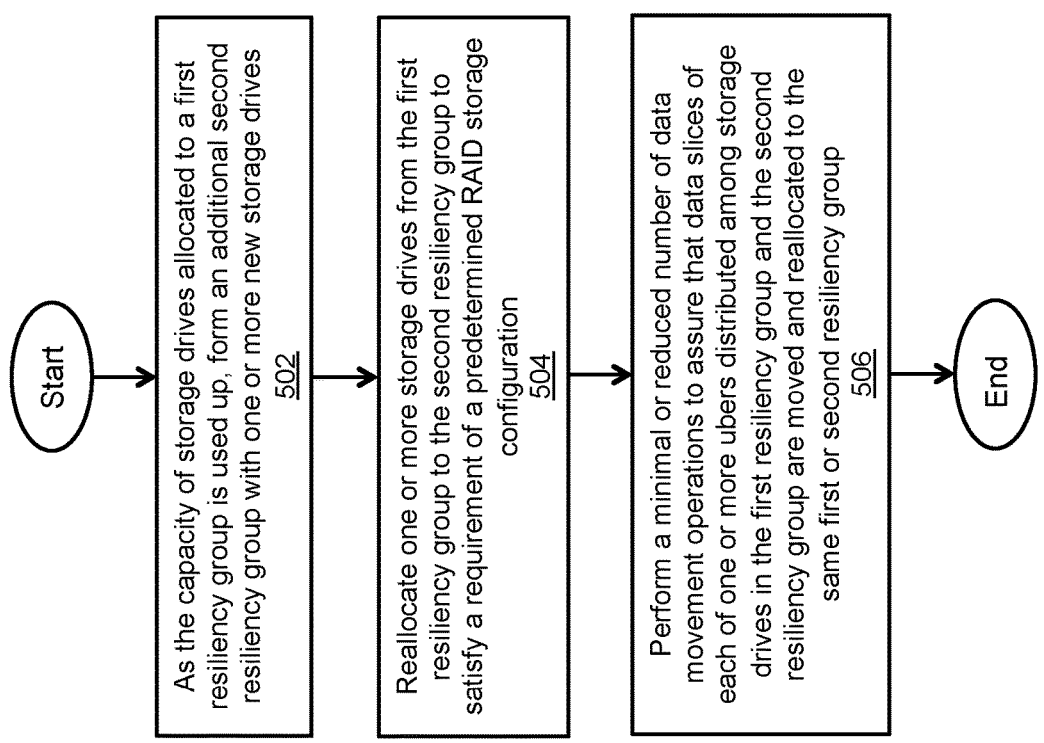
FIG. 5 is a flow diagram of an exemplary method of mapping ubers into resiliency groups in a data storage system.

An exemplary method of mapping ubers into resiliency groups in a data storage system is described below with reference to FIG. 5. As depicted in block 502, as the capacity of storage drives allocated to a first resiliency group is used up, an additional second resiliency group is formed with one or more new storage drives. As depicted in block 504, one or more storage drives are reallocated from the first resiliency group to the second resiliency group to satisfy a requirement of a predetermined RAID storage configuration. As depicted in block 506, a minimal or reduced number of data movement operations are performed to assure that data slices of each of one or more ubers distributed among storage drives in the first resiliency group and the second resiliency group are moved and reallocated to the same first or second resiliency group. In this way, data storage systems can be made to support a desired level of storage drive expansion with reduced complexity and cost for data storage customers.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system. An LU may be used interchangeably with a logical volume. An LU or LUN may be used interchangeably with each other. A LUN may be a logical unit number for identifying an LU, and may also refer to one or more virtual disks or virtual LUNs, which may correspond to one or more virtual machines. A physical storage unit may be a physical entity, such as a drive or disk or an array of drives or disks, for storing data in storage locations that can be accessed by address. A physical storage unit may used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, and may include multiple levels of virtual-to-physical mappings, and may be or include an image or disk image. A storage medium may be computer-readable, and may also be referred to as a computer-readable program medium.

As employed herein, the term "IO request" or simply "IO" may be used to refer to an input or output request, such as a data read request or a data write request.

As employed herein, the terms, "such as," "for example," "e.g.," "exemplary," and variants thereof, describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of mapping ubers into resiliency groups in a data storage system, comprising:
    as a capacity of storage drives allocated to a first resiliency group is used up, forming an additional second resiliency group with one or more new storage drives;
    reallocating one or more of the storage drives from the first resiliency group to the second resiliency group to satisfy a requirement of a predetermined redundant array of independent disks (RAID) storage configuration, the reallocating of the storage drives causing data slices of one or more ubers to be distributed among storage drives in the first resiliency group and the second resiliency group;
    performing a minimal number of data movement operations to move the data slices of each of the one or more ubers distributed among the storage drives in the first resiliency group and the second resiliency group to the same first or second resiliency group;
    having reallocated the storage drives from the first resiliency group to the second resiliency group, determining, for each respective uber among the one or more ubers distributed in the first and second resiliency group, a first number of data slices of the respective uber that are allocated to storage drives in the first resiliency group and a second number of data slices of the respective uber that are allocated to storage drives in the second resiliency group; and
    for each respective uber among the one or more ubers distributed in the first and second resiliency group, determining a maximum number among the first number and the second number of data slices of the respective uber.

2. The method of claim 1 further comprising:
    having performed the minimal number of data movement operations to move the data slices of the respective ubers to the same first or second resiliency group, forming one or more sub-groups of storage drives in each of the first resiliency group and the second resiliency group, each sub-group of storage drives being arranged in the predetermined RAID storage configuration.

3. The method of claim 1 further comprising:
    having determined the maximum number of the data slices of the respective uber, obtaining an available storage capacity of a respective resiliency group among the first resiliency group and the second resiliency group that corresponds to the maximum number of the data slices of the respective uber.

4. The method of claim 3 further comprising:
    determining that the available storage capacity of the respective resiliency group is sufficient to store all of the data slices of the respective uber; and
    assigning the respective uber to the respective resiliency group.

5. The method of claim 4 wherein the performing of the minimal number of data movement operations includes moving a minimum number of the data slices of the respective uber to the respective resiliency group to store all of the data slices of the respective uber in the respective resiliency group.

6. The method of claim 5 wherein the moving of the minimum number of the data slices of the respective uber to the respective resiliency group includes storing each of the data slices of the respective uber in a spare data slice of a respective storage drive in the respective resiliency group.

7. The method of claim 5 wherein the moving of the minimum number of the data slices of the respective uber to the respective resiliency group further includes determining that no spare data slices are available in the respective resiliency group, and storing each of the data slices of the respective uber in a reserved data slice of a respective storage drive in the respective resiliency group.

8. A data storage system, comprising:
    a storage drive array including a plurality of storage drives allocated to a first resiliency group;
    a memory; and
    processing circuitry configured to execute program instructions out of the memory:
        to form, as a capacity of storage drives allocated to a first resiliency group is used up, an additional second resiliency group with one or more new storage drives;
        to reallocate one or more of the storage drives from the first resiliency group to the second resiliency group to satisfy a requirement of a predetermined redundant array of independent disks (RAID) storage configuration, thereby causing data slices of one or more ubers to be distributed among storage drives in the first resiliency group and the second resiliency group; and
        to perform a minimal number of data movement operations to move the data slices of each of the one or more ubers distributed among the storage drives in the first resiliency group and the second resiliency group to the same first or second resiliency group;
        having reallocated the storage drives from the first resiliency group to the second resiliency group, to determine, for each respective uber among the one or more ubers distributed in the first and second resiliency group, a first number of data slices of the respective uber that are allocated to storage drives in the first resiliency group and a second number of data slices of the respective uber that are allocated to storage drives in the second resiliency group; and
        to determine, for each respective uber among the one or more ubers distributed in the first and second resiliency group, a maximum number among the first number and the second number of data slices of the respective uber.

9. The data storage system of claim 8 wherein the processing circuitry is further configured to execute the program instructions out of the memory:
    having performed the minimal number of data movement operations to move the data slices of the respective ubers to the same first or second resiliency group, to form one or more sub-groups of storage drives in each of the first resiliency group and the second resiliency group, each sub-group of storage drives being arranged in the predetermined RAID storage configuration.

10. The data storage system of claim 8 wherein the processing circuitry is further configured to execute the program instructions out of the memory:
    having determined the maximum number of the data slices of the respective uber, to obtain an available storage capacity of a respective resiliency group among the first resiliency group and the second resiliency group that corresponds to the maximum number of the data slices of the respective uber.

11. The data storage system of claim 10 wherein the processing circuitry is further configured to execute the program instructions out of the memory:

to determine that the available storage capacity of the respective resiliency group is sufficient to store all of the data slices of the respective uber; and to assign the respective uber to the respective resiliency group.

12. The data storage system of claim 11 wherein the processing circuitry is further configured to execute the program instructions out of the memory:

to move a minimum number of the data slices of the respective uber to the respective resiliency group for storing all of the data slices of the respective uber in the respective resiliency group.

13. The data storage system of claim 12 wherein the processing circuitry is further configured to execute the program instructions out of the memory:

to store each of the data slices of the respective uber in a spare data slice of a respective storage drive in the respective resiliency group.

14. The data storage system of claim 12 wherein the processing circuitry is further configured to execute the program instructions out of the memory:

to determine that no spare data slices are available in the respective resiliency group; and to store each of the data slices of the respective uber in a reserved data slice of a respective storage drive in the respective resiliency group.

15. The data storage system of claim 12 wherein the processing circuitry is further configured to execute the program instructions out of the memory:

to maintain, for each respective uber, indications of (i) an assignment of the respective uber to the respective resiliency group, and (ii) allocations of the data slices of the respective uber within the respective resiliency group, as data structure metadata in one or more of the memory and the storage drive array of the data storage system.

16. A computer program product including a set of non-transitory, computer-readable media having instructions that, when executed by processing circuitry of a data storage system, cause the processing circuitry to perform a method of mapping ubers into resiliency groups in the data storage system, the method comprising as a capacity of storage drives allocated to a first resiliency group is used up, forming an additional second resiliency group with one or more new storage drives;

reallocating one or more of the storage drives from the first resiliency group to the second resiliency group to satisfy a requirement of a predetermined redundant array of independent disks (RAID) storage configuration, the reallocating of the storage drives causing data slices of one or more ubers to be distributed among storage drives in the first resiliency group and the second resiliency group;

performing a minimal number of data movement operations to move the data slices of each of the one or more ubers distributed among the storage drives in the first resiliency group and the second resiliency group to the same first or second resiliency group;

having reallocated the storage drives from the first resiliency group to the second resiliency group, determining, for each respective uber among the one or more ubers distributed in the first and second resiliency group, a first number of data slices of the respective uber that are allocated to storage drives in the first resiliency group and a second number of data slices of the respective uber that are allocated to storage drives in the second resiliency group; and for each respective uber among the one or more ubers distributed in the first and second resiliency group, determining a maximum number among the first number and the second number of data slices of the respective uber.

* * * * *